United States Patent Office 3,548,596
Patented Dec. 22, 1970

3,548,596
MULTI-GEARED SINGLE SCREW SYSTEM
Masaaki Mizushina, Fujiwawa-shi, and Koji Toyota, Yokohama-shi, Japan, assignors to Nippon Kokan Kabushiki Kaisha, Tokyo, Japan, a corporation of Japan
Filed Nov. 27, 1968, Ser. No. 779,482
Claims priority, application Japan, Dec. 5, 1967, 42/77,626
Int. Cl. F01b *21/00;* F02b *73/00*
U.S. Cl. 60—97     1 Claim

ABSTRACT OF THE DISCLOSURE

A multi-geared single screw system involves a mother governor for maintaining the revolution of one engine at a value variable according to an operator's desire so as to automatically control the opening of a fuel injection valve of said engine, and another governor for maintaining the revolution of another engine or engines respectively at a value which is slightly higher than that of the mother governor, the opening of the respective injection valves being defined by the revolutions of the engines through the control of the respective governors when the system is driven with a lower torque than determined, and on the other hand the opening of the respective injection valves being defined by the revolution of the first-mentioned engine through the control of the mother governor when the system is driven with a greater torque than determined.

---

This invention relates to a multi-geared single screw system used in driving a ship, and more particularly to a multi-engine -and- one propeller shaft system whose engine speeds are limited by means of governors attached to said engines respectively.

The prior art multi-geared single screw system was generally remote-controlled so that engines might be driven at a speed limited by a governor attached to the respective engines.

Although such system was conveniently controlled when the engines were operated within a smaller range than a maximum torque developed by one engine, the system had to be controlled by manually handling each governor when the load of the engines exceeded said maximum torque.

However, said manual control involved difficulties in applying a uniform load to all engines so as to prevent one or more of said engines from being excessively loaded over a maximum value.

Another prior art system has been known whose engines were driven at a speed limited by a governor attached to a screw.

Such system raised the problem that where one of the engines was driven to let a ship go ahead, with the other engine previously set in operation so as to immediately let a ship go aback by means of a clutch, the operation of said clutch was very difficult.

Still another prior art system has been known, whose engines were driven at a speed limited by a governor attached to the respective engines when the engines were driven with a lower torque, but whose engines were driven at a speed limited by controlling the opening of the respective injection valves thereof by means of a separate device from said governor when said engines were driven with a greater torque.

However, said system unavoidably comprises a complicated circuit for automatically controlling the speed of the respective engines regardless of the torque involved.

An object of this invention is to provide a multi-geared single screw system capable of conveniently controlling engines merely by a governor system regardless of the torque involved.

In an aspect of this invention, said multi-geared single screw system comprises one among the governors (mother governor) for maintaining the revolution of said engine at a value variable according to an operator's desire, a fuel injection valve whose opening is automatically controlled by the operation of said governor, another governor or governors for presetting the revolution of another engine or engines respectively at a value which is slightly higher than that of the above mother governor, and another injection valve or valves whose opening or openings are defined by the revolutions of the latter engine or engines through the control of the latter governor or governors when the system is driven with a lower torque than a prescribed level of one engine, but whose opening or openings are defined by the revolution of said mother engine through the control of the above mother governor when the system is driven with a greater torque than that prescribed.

The present invention can be more fully understood from the following detailed description when taken in conjunction with reference to the appended drawings, in which.

Figure 1:
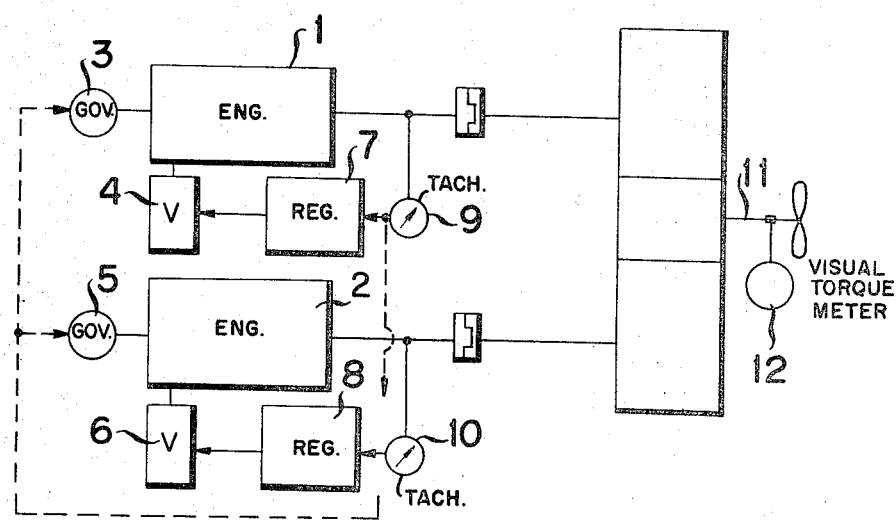
FIG. 1 is a diagrammatical plan view of a multi-geared single screw system embodying this invention, wherein the engines are driven with a lower torque than a prescribed level to be developed by one engine.
Figure 2:
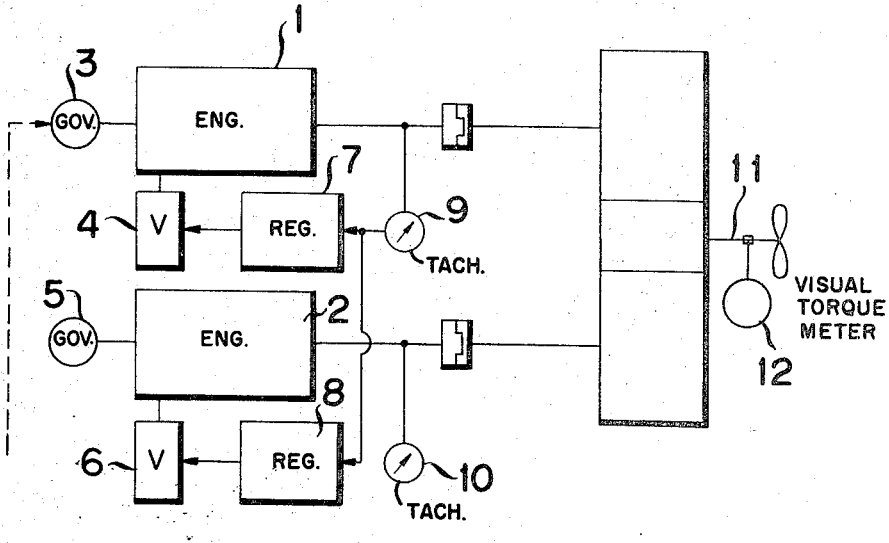
FIG. 2 is a diagrammatical plan view of said system of FIG. 1, wherein said engines are driven with a greater torque than a prescribed level to be developed by one engine.

Referring to FIGS. 1 and 2, a multi-geared single screw system of this invention is of a type having two engines 1 and 2. To said engine 1 are attached a mother governor 3 for maintaining the revolution of said engine 1 at a value variable according to an operator's desire, and an injection valve 4 for supplying fuel to said engine 1. To said other engine 2 are also attached a second or another governor 5 for presetting the revolution of said engine 2 at a value which is slightly higher than that of the above mother governor 3, and another injection valve 6 for supplying fuel to said engine 2.

Said engines 1 and 2 further have devices 7 and 8 for regulating the amounts of fuel to be jetted from the openings of said valves 4 and 6. Said regulating devices 7 and 8 are generally driven by tachometer generators 9 and 10 which are attached to the drive shafts of said engines 1 and 2 respectively.

Said injection valve 4 has its opening defined by the revolution of the mother engine 1 through the control of the governor 3. Namely, said tachometer generator 9 supplies, according to the revolution of said engine 1, a driving signal to said regulating device 7 so as to control the extent of opening said valve 4.

On the other hand, when the system is driven with a lower torque, which is at least lower than that prescribed by one engine, the opening of said injection valve 6 is defined by the revolution of the engine 2 through the control of the governor 5. In this case, said tachometer generator 10 supplies, according to the revolution of said engine 2, a driving signal to said regulating device 8 so as to control the extent of opening said valve 6.

And when the system is driven with a greater torque than the aforementioned level, the opening of the valve 6 is defined by the revolution of the engine 1 through the control of the governor 3. In this case, said tachometer generator 9 supplies, according to the revolution of said engine 1, a driving signal to said regulating device 7 so as to control the extent of opening said valve 6. The operation of changing from the tachometer generator 10 to the other generator 9 is manually or automatically made by suitable means (not shown) already known.

Figure 3:
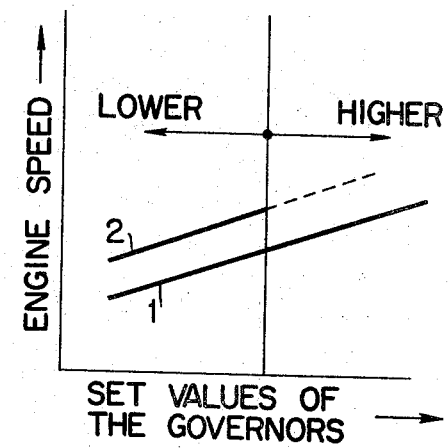
FIG. 3 is a diagram of the speed of the respective engines variable with the set value of a governor attached to said respective engines; and, FIG. 4 is a diagram of the revolution of a screw variable with the amounts of fuel supplied to the respective engines.

When a screw shaft 11 is loaded in operation to an extent exceeding the prescribed torque which may be measured by a torque-meter 12 secured thereto, the extent of opening the valve 6 is defined by the revolution of the engine 1 as mentioned above. In this case, since the revolution of the engine 2 is preset higher than that of the engine 1, the opening of said valve 6 is controlled by the act of said regulating device 8 driven by a signal supplied by the tachometer generator 9 so that the speed of the engine 2 is immediately restricted or reduced to the same level as that of the engine 1 as indicated in FIG. 3.

Figure 4:
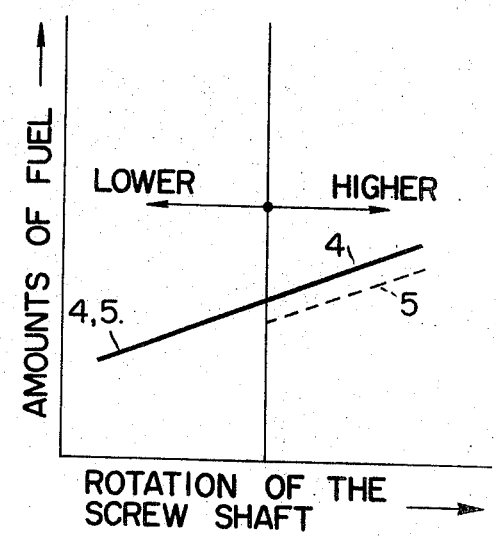

FIG. 4 indicates the amounts of fuel supplied from each of the valves 4 and 6 to each of the engines 1 and 2 each time the torque or rotation of said screw shaft 11 driven by the above engines is continuously increased, and more particularly when each valve is controlled by the operation of each governor and when both valves are controlled by the operation of the mother governor 3.

The aforementioned embodiment of this invention comprises only a two-geared single screw system. However, the invention can, of course, be applied to a more than three-geared single screw system.

What is claimed is:

1. A multi-geared single screw system, comprising in combination:
    (a) one first and at least one second engine (1, 2), said engines receiving fuel and control on their input side and a driving shaft (11) on the output side;
    (b) tachometer means (9, 10) on said output side for providing a driving signal for each engine;
    (c) a mother governor (3) connected to said first engine (1) for maintaining the revolution of said first engine at a value variable by an operator;
    (d) a first fuel injection valve (4) coupled to said first engine input side whose opening is automatically controlled by the operation of said mother governor;
    (e) at least one other governor (5) connected to said second engine, for presetting the revolution of said second engine at a value which is slightly higher than that of said mother governor; and,
    (f) a second injection valve (6) whose opening is defined by the mother governor according to a signal supplied by said tachometer means when the system is driven with a lower torque, but whose opening is defined by the fuel consumption of said mother engine through the control of the mother governor according to a signal supplied by said tachometer means when the system is driven with a greater torque.

References Cited

UNITED STATES PATENTS

| | | | |
|---|---|---|---|
| Re. 20,487 | 8/1937 | Schmidt | 60—97S |
| 2,105,089 | 1/1938 | Martin | 60—97S |
| 2,173,913 | 9/1939 | Morehouse | 60—97SX |
| 2,258,462 | 10/1941 | Martin | 60—97S |
| 2,374,276 | 4/1945 | French | 60—97SX |
| 2,382,847 | 8/1945 | Baumann, Jr. | 60—97SX |
| 3,365,882 | 1/1968 | Greune | 60—97X |

MARTIN P. SCHWADRON, Primary Examiner

R. BUNEVICH, Assistant Examiner

U.S. Cl. X.R.

60—39.15